(12) United States Patent
Osaka et al.

(10) Patent No.: US 10,451,834 B2
(45) Date of Patent: Oct. 22, 2019

(54) LENS HOLDER DRIVING DEVICE AND MOBILE TERMINAL WITH CAMERA

(71) Applicants: Tomohiko Osaka, Tokyo (JP); Takashi Ishizawa, Tokyo (JP)

(72) Inventors: Tomohiko Osaka, Tokyo (JP); Takashi Ishizawa, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/318,388

(22) PCT Filed: May 27, 2015

(86) PCT No.: PCT/JP2015/065188
§ 371 (c)(1),
(2) Date: Dec. 13, 2016

(87) PCT Pub. No.: WO2015/194337
PCT Pub. Date: Dec. 23, 2015

(65) Prior Publication Data
US 2017/0123180 A1    May 4, 2017

(30) Foreign Application Priority Data
Jun. 16, 2014 (JP) ................................. 2014-123210

(51) Int. Cl.
*G02B 7/09* (2006.01)
*H04N 5/225* (2006.01)
(Continued)

(52) U.S. Cl.
CPC .................. *G02B 7/09* (2013.01); *G02B 7/08* (2013.01); *G02B 27/646* (2013.01);
(Continued)

(58) Field of Classification Search
CPC ........ G02B 7/022; G02B 13/001; G02B 7/00; G02B 7/10; G02B 7/02; G02B 7/026;
(Continued)

(56) References Cited

U.S. PATENT DOCUMENTS 4,665,127 A * 5/1987 Hirose ............... C08G 65/3322
525/100
2006/0028929 A1 2/2006 Osaka
(Continued)

FOREIGN PATENT DOCUMENTS

JP 2006-251111 A 9/2006
JP 2009-150677 A 7/2009
(Continued)

OTHER PUBLICATIONS

International Search Report from International Application No. PCT/JP2015/065188 dated Aug. 18, 2015.
(Continued)

*Primary Examiner* — Evan P Dzierzynski
*Assistant Examiner* — Alberto Betancourt
(74) *Attorney, Agent, or Firm* — Brundidge & Stanger, P.C.

(57) ABSTRACT

In a lens holder driving device, each of an upper plate spring and a lower plate spring, which are respectively provided on an upper side and a lower side of a lens holder, has an inner peripheral side end fixed to the lens holder, an outer peripheral side end fixed to a fixing part, and a plurality of arms. The plurality of arms of the upper plate spring and the plurality of arms of the lower plate spring have substantially identical shapes in a plan view. Each of the plurality of arms includes at least one U-turn shaped portion that is folded over. Either the upper plate spring or the lower plate spring has at least one stretchable and flexible resin that is provided
(Continued)

so as to straddle over the mutually opposing parts of the U-turn shaped portion of the plurality of arms.

8 Claims, 13 Drawing Sheets

(51) Int. Cl.
  *G02B 7/08*    (2006.01)
  *H02K 41/035*    (2006.01)
  *G02B 27/64*    (2006.01)

(52) U.S. Cl.
  CPC ....... *H02K 41/0356* (2013.01); *H04N 5/2253* (2013.01); *H04N 5/2254* (2013.01)

(58) Field of Classification Search
  CPC .......... G02B 7/09; G02B 7/023; G02B 7/025; G02B 7/08; G02B 27/646; G03B 2205/0053; G03B 17/12; G03B 2205/0038; H02K 41/0356; F16F 1/027; F16F 3/02; H04N 5/2254; H04N 5/2253; H04N 5/2257
  USPC ....... 359/642, 811, 819, 822, 823, 824, 813; 396/55, 133, 52; 353/96, 100–101, 105; 352/231
See application file for complete search history.

(56) References Cited

U.S. PATENT DOCUMENTS

| | | | |
|---|---|---|---|
| 2009/0119966 A1* | 5/2009 | Liou | ........................ G09F 1/10 40/773 |
| 2010/0014176 A1* | 1/2010 | Wang | ................ H02K 41/0356 359/822 |
| 2011/0080661 A1* | 4/2011 | Kuo | ....................... G02B 7/023 359/811 |
| 2012/0120512 A1 | 5/2012 | Wade et al. | |
| 2012/0154614 A1* | 6/2012 | Moriya | .................... G03B 3/10 348/208.5 |
| 2012/0229927 A1 | 9/2012 | Ohishi et al. | |
| 2013/0016428 A1* | 1/2013 | Sugawara | ................ G02B 7/08 359/557 |
| 2013/0215511 A1* | 8/2013 | Wu | ....................... G02B 27/646 359/554 |
| 2015/0212288 A1* | 7/2015 | Inagaki | .................... G02B 7/08 359/824 |

FOREIGN PATENT DOCUMENTS

| | | |
|---|---|---|
| JP | 2009-271204 A | 11/2009 |
| JP | 2011-022562 A | 2/2011 |
| JP | 2011-081381 A | 4/2011 |
| JP | 2012-032607 A | 2/2012 |
| JP | 2012-058762 A | 3/2012 |
| JP | 2012-088728 A | 5/2012 |
| JP | 5483223 B1 | 5/2014 |
| JP | 5489747 B2 | 5/2014 |

OTHER PUBLICATIONS

Extended European Search Report issued in EP 15809271.8 dated May 16, 2018.

* cited by examiner

| ITEM | Pattern |
|------|---------|
| Pin1 | ACT Terminal (+) |
| Pin2 | Hall output (−) |
| Pin3 | Hall input (+) |
| Pin4 | GND |
| Pin5 | Hall output (+) |
| Pin6 | Hall input (−) |
| Pin7 | ACT Terminal (−) |

LENS HOLDER DRIVING DEVICE AND MOBILE TERMINAL WITH CAMERA

TECHNICAL FIELD

The present invention relates to a lens holder driving device, and particularly relates to a lens holder driving device and a camera-equipped mobile terminal in which a lens holder (movable part) to which a lens barrel can be attached can move in a light axis direction of a lens.

BACKGROUND ART

A small-sized mobile camera is installed in a camera-equipped mobile terminal. In this small-sized mobile camera, an auto focus (AF) lens holder driving device is used. VCM systems using a voice coil motor (VCM) are known as a driving mechanism (actuator) used for the above-mentioned AF lens holder driving device. An AF lens holder driving device of the VCM type includes a magnetic circuit composed of a driving coil, a yoke and a permanent magnet as a driving mechanism (actuator). The driving mechanism of the VCM type is roughly categorized into the driving mechanism of "moving coil type" and the driving mechanism of "moving magnet type."

An AF lens holder driving device of the VCM type employs a spring member (elastic member) that supports a columnar movable part including a lens (a lens and a lens holder) such that the movable part is displaceable in the light axis direction (center axis direction) in a state where the position of the movable part in the radial direction with respect to the fixing part is set. It is to be noted that the movable part is also referred to as moving body or movable body, and the fixing part is also referred to as fixing member, supporting body, housing, or fixing body. The above-mentioned driving mechanism is provided in the movable part (moving body) and the fixing part (fixing member; supporting body).

As the above-mentioned spring member (elastic member), in general, a pair of leaf springs which are provided on the both sides in the light axis direction of a lens holder (columnar movable part; moving body) that holds a lens assembly (lens barrel) are used. The pair of leaf springs supports the lens holder (columnar movable part; moving body) such that the lens holder is displaceable in the light axis direction in a state where the position in the radial direction of the lens holder is set with respect to the housing (cylindrical fixing part; fixing member; supporting body) disposed at the periphery thereof. One of the pair of leaf springs is referred to as upper leaf spring, and the other is referred to as lower leaf spring.

It is to be noted that the upper leaf spring is also referred to as front spring or front spring member, and the lower leaf spring is also referred to as rear spring or rear spring member.

With the above-mentioned configuration, in an AF lens holder driving device of the VCM type, the restoration force (biasing force) of the leaf spring (spring member) and the thrust (driving force) of the driving mechanism are balanced, and the movable part (moving body) is moved to a predetermined position (target position) in the light axis direction. In the AF lens holder driving device of the VCM type having such a configuration, the movable part (moving body) is supported with the leaf spring (spring member) with respect to the fixing part (fixing member; housing; supporting body), and therefore the movable part (moving body) is vibrated more than necessary by driving of the movable part (moving body), or by vibration, impact and the like from the outside.

Conventionally, various measures against such a problem have been proposed.

For example, in PTL 1, a buffer member composed of elastic resin is disposed at a leaf spring in which a plurality of cutout grooves are provided and a coupling part of the lens holder and the fixing member is formed. The buffer member is disposed in a region around the connection portion of the lens holder and the leaf spring, and in a region around the connection portion of the fixing member and the leaf spring.

In addition, in PTL 2, damping agent is applied to a spring including an outer ring, an inner ring and an elastic coupling part for coupling the rings. The damping agent is applied at a portion nearer to the inner ring of the elastic coupling part.

Further, in PTL 3, a buffer member having viscoelasticity is provided to a front spring member that is connected to a front end portion of a moving body in the lens light axis direction and a supporting body, and includes a supporting body coupling part, a moving body coupling part, and an arm part configured to connect the coupling parts. The buffer member is provided at only a part that extends between the moving body coupling part and a portion nearer to the connecting part of the arm part with the supporting body coupling part than the connecting part of the arm part with the moving body coupling part in the arm part, in portions that bridge the arm part.

Furthermore, in PTL 4, a spring member that connects a movable body and a fixing body is provided with a buffer member having viscoelasticity that reduces the vibration time of the movable body by absorbing the vibration of the movable body with respect to the fixing body in the light axis direction. At the installation position of the buffer member, a protrusion and/or a recess serving as a guide of the installation range of the buffer member is formed. The spring member includes a movable side fixing part that is fixed to the movable body, a fixation side fixing part that is fixed to the fixing body, and an arm part that connects the movable side fixing part and the fixation side fixing part. One end of the arm part which is connected with the movable side fixing part is the top end of the arm part, and the other end of the arm part which is connected with the fixation side fixing part of the arm part is the base end. The buffer member is provided at least one of the following portions: a portion extending between the movable side fixing part and the fixation side fixing part, a portion extending between parts of the arm part except for the top side and the movable side fixing part, a portion extending between parts of the arm part except for the base end side and the fixation side fixing part, a portion extending between the movable body and the fixation side fixing part, a portion extending between the fixing body and the movable side fixing part, a portion extending between parts of the arm part except for the end side and the movable body, a portion extending between parts of the arm part except for the base end side and the fixing body, and a portion extending between the movable body and the fixing body.

In addition, conventionally, the lens position is controlled by feedback control to improve the focusing accuracy (see, for example, PTL 5). The image pickup device lens disclosed in PTL 5 includes a driving device for adjusting the lens position, and a position detection device for detecting the lens position. A focus control circuit that is installed in the image pickup device includes a feedback equalizer that generates a driving signal for aligning the lens position with the target position based on the difference between the lens position that is specified with the output signal of the position detection device and a target position of the lens that is externally set, and controls the driving device.

CITATION LIST

Patent Literature

PTL 1
Japanese Patent Application Laid-Open No. 2006-251111
PTL 2
Japanese Patent Application Laid-Open No. 2009-271204
PTL 3
Japanese Patent Publication No. 5489747
PTL 4
Japanese Patent Application Laid-Open No. 2012-32607
PTL 5
Japanese Patent Application Laid-Open No. 2011-22562

SUMMARY OF INVENTION

Technical Problem

Incidentally, in an AF lens holder driving device of the VCM type, the movable part is vertically moved in the light axis direction with the thrust (driving force) of the driving mechanism, against the restoration force (biasing force) of the leaf spring (spring member). Accordingly, when the restoration force (biasing force) of the leaf spring (spring member) is large, the thrust (driving force) of the driving mechanism is required to be large, and as a result, a large driving current is required to be supplied to the driving coil.

PTLS 1 to 4 have the following problems.

In PTL 1, the buffer member is disposed in a region around a position where the holder or the fixing member and the leaf spring are connected together. Consequently, in comparison with a conventional leaf spring provided with no buffer member, the restoration force of the leaf spring provided with the buffer member in the light axis direction is undesirably large. In other words, the spring constant of the leaf spring in the light axis direction is varied. As a result, a large driving current is required to be supplied to the driving coil against the restoration force of the leaf spring.

In PTL 2, the damping agent is applied to a portion closer to the inner ring of the elastic coupling part of the spring. Consequently, as with PTL 1, in comparison with a conventional spring provided with no damping agent, the restoration force of the spring provided with the damping agent is undesirably large. In other words, the spring constant of the spring in the light axis direction is varied. As a result, a large driving current is required to be supplied to the driving coil against the restoration force of the spring.

In PTL 3, the buffer member having viscoelasticity is provided as a bridge between the moving body coupling part and the arm part of the front spring member. Consequently, as with PTLS 1 and 2, in comparison with a conventional front spring member provided with no buffer, the biasing force (restoration force) of the front spring member provided with the buffer member is undesirably large. In other words, the spring constant of the front spring member in the lens light axis direction is varied. As a result, a large driving current is required to be supplied to the driving coil against the restoration force of the front spring member.

Also in PTL 4, the buffer member having viscoelasticity is provided as a bridge between two portions of the spring member. Consequently, as with PTLS 1 to 3, in comparison with a conventional spring member provided with no buffer, the biasing force (restoration force) of the spring member provided with the buffer member is undesirably large. In other words, the spring constant of the spring member in the lens light axis direction is varied. As a result, a large driving current is required to be supplied to the driving coil against the restoration force of the spring member.

That is, the lens holder driving devices disclosed in PTLS 1 to 4 cannot achieve power saving.

In view of this, for the purpose of achieving power saving, the present inventors studied an approach of minimizing the restoration force (biasing force) of the leaf spring (spring member). As a solution, the present inventors arrived at an idea of increasing the length of the arm part of the leaf spring (spring member). To increase the length of the arm part, the present inventors prototyped a novel leaf spring in which the arm part is provided with a U-turn-shaped portion that is folded-back by 180 degrees. In addition, actually, a lens holder driving device using the novel leaf spring in place of a conventional leaf spring was prototyped.

In addition, the present inventors tested the performance of the prototyped lens holder driving device. As a result, the present inventors confirmed that the movable part can be vertically moved in the light axis direction with a driving current (thrust) smaller than that of the conventional case.

However, the present inventors confirmed that another problem described below is caused when the leaf spring having such a long arm part is used.

To be more specific, to measure (create) the frequency response characteristics (Bode diagram) of the prototyped lens holder driving device, the present inventors detected the position of the movable part in the light axis direction with a position detection device attached to the lens holder driving device while applying vibration of a predetermined amplitude whose frequency is varied to the movable part. As a result, the present inventors confirmed that the movable part is vibrated (resonated) in the light axis direction at the natural frequency of the novel leaf spring, and in addition, the movable part sways (resonates) and turns around the optical axis at a frequency of approximately five times the natural frequency. It is considered that the turning of the movable part around the optical axis is caused by the increased length of the arm part of the leaf spring and the imbalance of the movement part (that is, the gravity center of the movement part is shifted from optical axis O of the lens). Here, the vibration (resonance) at the natural frequency is referred to as primary resonance (main resonance), and the sway (resonance) at a frequency of approximately five times the natural frequency is referred to as secondary resonance (sub resonance). In view of the foregoing, when the length of the arm part of the leaf spring is large, it is desired to suppress the sub resonance.

In particular, when performing the feedback control disclosed in PTL 5, the feedback control is negatively influenced by the sub resonance.

Accordingly, an object of the present invention is to provide a lens holder driving device which can suppress the secondary resonance (sub resonance) while achieving power saving.

Other objects of the present invention will be apparent from the following descriptions.

Solution to Problem

In an exemplary mode of the present invention, a lens holder driving device includes: a lens holder to which a lens barrel is attachable; a fixing part disposed at an outer periphery of the lens holder; a driving mechanism for driving the lens holder in a direction of an optical axis (O) of a lens; an upper leaf spring configured to couple the lens holder and the fixing part at an upper part thereof; and a lower leaf spring configured to couple the lens holder and the fixing part at a lower part thereof. Each of the upper leaf spring and the lower leaf spring includes an inner periphery side end part fixed to the lens holder, an outer periphery side end part fixed to the fixing part, and a plurality of arm parts provided along a circumferential direction for coupling between the inner periphery side end part and the outer periphery side end part. The arm parts of the upper leaf spring and the arm parts of the lower leaf spring have substantially the same shape in plan view. Each of the arm parts includes at least one U-turn-shaped portion having a folded-back shape. At least one of the upper leaf spring and the lower leaf spring includes at least one stretchable and flexible resin provided as a bridge between opposite portions in the U-turn-shaped portion of the arm parts.

Advantageous Effects of Invention

With the present invention, the secondary resonance (sub resonance) can be suppressed while achieving power saving.

BRIEF DESCRIPTION OF DRAWINGS

FIG. 8B showing a relationship between seven terminals of the conductor pattern of flexible printed circuit (FPC) and terminals connected to the seven terminals;

FIG. 13B being a Bode diagram showing frequency response characteristics of the lens holder driving device according to the present embodiment after application of the elastic adhesive agent (after the measure is taken);

DESCRIPTION OF EMBODIMENT

With reference to FIG. 1 to FIG. 4, lens holder driving device 10 according to an embodiment of the present invention is described.

Figure 1:
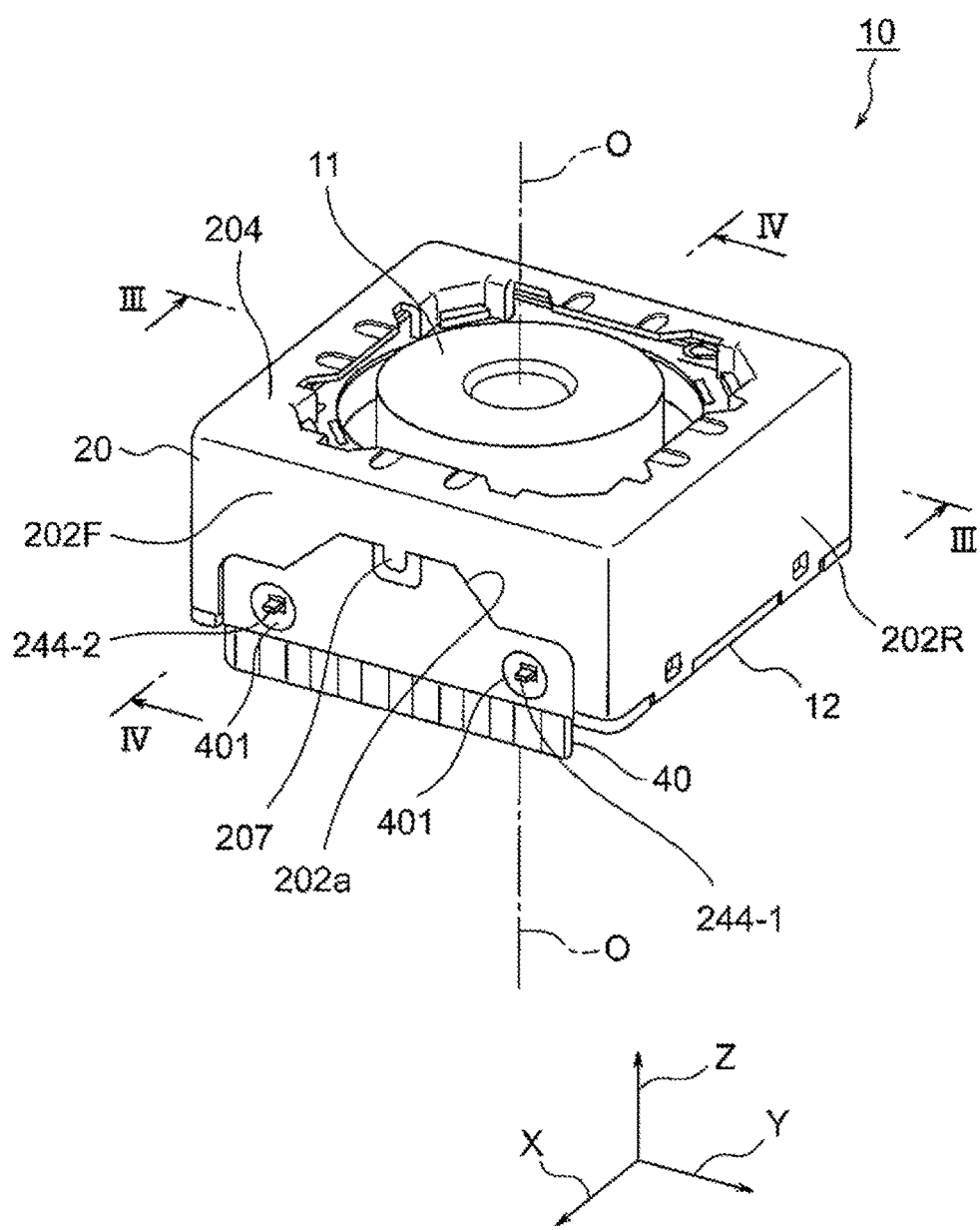
FIG. 1 is a perspective view of an external appearance of a lens holder driving device according to an embodiment of the present invention.
Figure 2:
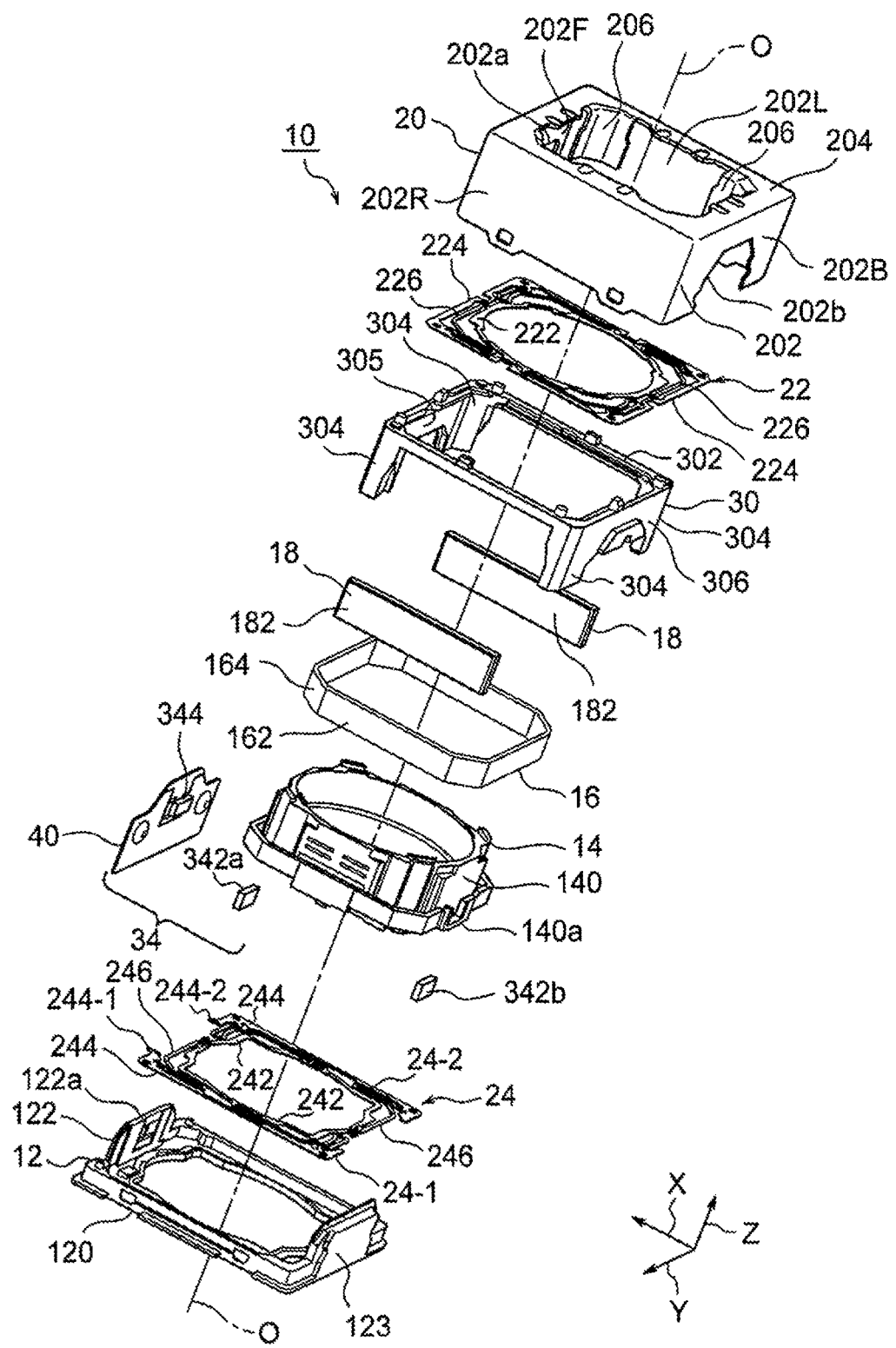
FIG. 2 is an exploded perspective view of the lens holder driving device illustrated in FIG. 1.
Figure 3:
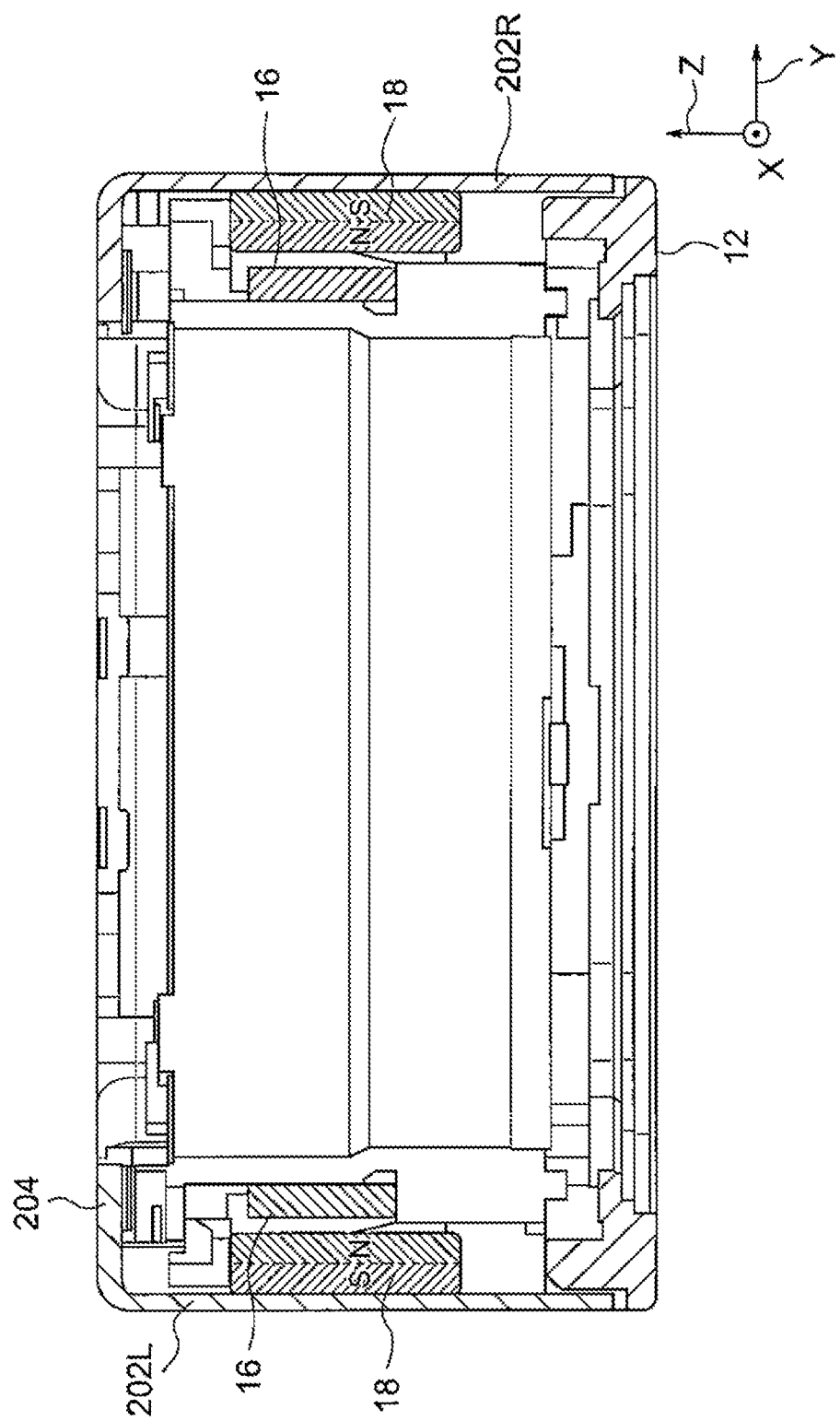
FIG. 3 is a longitudinal sectional view taken along the line of III-III FIG. 1.
Figure 4:
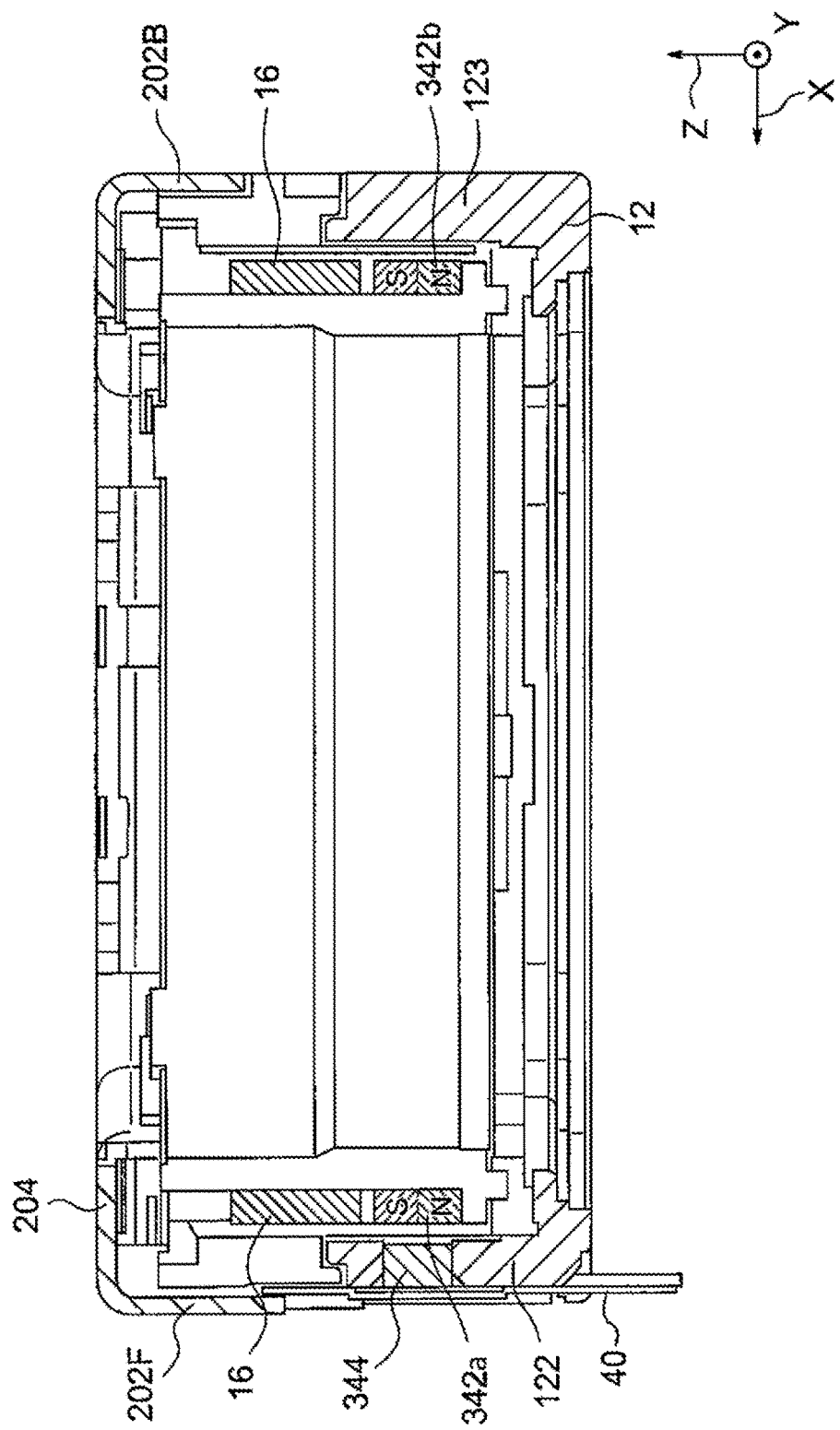
FIG. 4 is a longitudinal sectional view taken along the line IV-IV of FIG. 1.

FIG. 1 is a perspective view illustrating an external appearance of lens holder driving device 10. FIG. 2 is an exploded perspective view of lens holder driving device 10. FIG. 3 is a longitudinal sectional view taken along the line III-III of FIG. 1. FIG. 4 is a longitudinal sectional view taken along the line IV-IV of FIG. 1.

Here, as illustrated in FIG. 1 to FIG. 4, an orthogonal coordinate system (X, Y, Z) is used. In the orthogonal coordinate system (X, Y, Z) of FIG. 1 to FIG. 4, the X-axis direction is the front-rear direction (depth direction), the Y-axis direction is the horizontal direction (width direction), and the Z-axis direction is the vertical direction (height direction). In addition, in the example illustrated in FIG. 1 to FIG. 4, vertical direction Z is the direction of optical axis O of the lens. It is to be noted that, in the present embodiment, the Y-axis direction (horizontal direction) is also referred to as first direction, and the X-axis direction (front-rear direction) is also referred to as second direction.

It should be noted that, when actually used, the direction of optical axis O, that is, the Z-axis direction is the front-rear direction. In other words, the upward direction of the Z axis is the forward direction, and the downward direction of the Z axis is the rearward direction.

Lens holder driving device 10 illustrated in the drawing is a lens holder driving device that employs a voice coil motor (VCM) system using a VCM as the driving mechanism (actuator). The lens holder driving device of the VCM type includes a driving coil, and a magnetic circuit composed of a yoke and a permanent magnet as the driving mechanism (actuator) as described later. Lens holder driving device 10 illustrated in the drawing employs a driving mechanism of "moving coil type" as the driving mechanism of the VCM type.

Lens holder driving device 10 illustrated in the drawing is used in a mobile terminal capable of performing auto focus (AF) such as a camera-equipped mobile phone, a smartphone described later illustrated in FIG. 15, a note-type personal computer, a tablet-type personal computer, a mobile game machine, a Web camera, and an in-vehicle camera.

Lens holder driving device 10 illustrated in the drawing is intended for moving lens holder 14 (described later) that holds lens barrel 11 in the direction of optical axis O. Accordingly, optical axis O is the driving axis (central axis). Lens holder driving device 10 includes base member (actuator base) 12 disposed on the lower side (rear side) in the Z-axis direction (the direction of optical axis O).

At a lower portion (rear portion) of base member (actuator base) 12, a sensor substrate (not illustrated) is disposed. On the sensor substrate, electronic components such as an imaging device and a clock generation source are installed. Lens holder driving device 10 and the sensor substrate are covered with a shield case (not illustrated). The shield case blocks electromagnetic noise generated by the sensor substrate.

A camera module is composed of a combination of lens holder driving device 10, the sensor substrate, the imaging device, and the shield case.

The imaging device captures a subject image imaged by lens barrel 11 and converts the image into an electric signal. The imaging device is composed of, for example, a charge coupled device (CCD) image sensor, a complementary metal oxide semiconductor (CMOS) image sensor or the like.

Lens holder driving device 10 includes: lens holder 14 including cylindrical part 140 for holding lens barrel 11; ring-shaped driving coil 16 fixed to lens holder 14 such that it is located at the outer periphery of cylindrical part 140; yoke 20 having a substantially quadrangular cylindrical shape including driving magnet 18 that is opposite to driving coil 16; and a pair of leaf springs 22 and 24 provided on both sides of cylindrical part 140 of lens holder 14 in the direction of optical axis O.

To attach lens barrel 11 to lens holder 14, lens barrel 11 is housed in lens holder 14, and lens barrel 11 and lens holder 14 are joined to each other with adhesive agent or the like.

In addition, the magnetic circuit is composed of a combination of driving magnet 18 and yoke 2.

The pair of leaf springs 22 and 24 supports lens holder 14 such that lens holder 14 is displaceable in the direction of optical axis O while setting the position of lens holder 14 in the radial direction. Regarding the pair of leaf springs 22 and 24, leaf spring 22 is referred to as upper leaf spring, and leaf spring 24 is referred to as lower leaf spring.

In addition, as described above, when actually used, the upward direction of the Z-axis direction (the direction of optical axis O) is the forward direction, and the downward direction of the Z-axis direction (the direction of optical axis O) is the rearward direction. Accordingly, upper leaf spring 22 is also referred to as front spring, and lower leaf spring 24 is also referred to as rear spring.

Upper leaf spring (front spring) 22 and lower leaf spring (rear spring) 24 are formed of a metal such as stainless steel, beryllium copper and nickel copper. In addition, upper leaf spring (front spring) 22 and lower leaf spring (rear spring) 24 is manufactured by working such as etching using photolithographic technique and pressing with a predetermined thin plate. Regarding the working, etching is preferable than pressing. The reason for this is that no residual stress is left in the leaf spring which has been subjected to etching.

In addition, preferably, the material of the leaf spring is stainless steel, or in particular, high-hardness stainless steel than beryllium copper. The reason for this is that a compound of beryllium is known to be highly toxic, and it is desirable to use materials other than beryllium copper as the material of the leaf spring (beryllium free) from the standpoint of environmental conservation. It is to be noted that as the high-hardness stainless steel, NTK S-4 or NTK 301 (SUS301) available from Nippon Metal Industry Co., Ltd. may be used.

As illustrated in FIG. 1 and FIG. 2, yoke 20 has a substantially quadrangular cylindrical shape. That is, yoke 20 includes outer cylinder part 202 having a substantially square cylindrical shape, and upper end portion 204 having a substantially quadrangular ring shape protruding to the inner side of outer cylinder part 202 at the upper end (front end) of outer cylinder part 202. In addition, at the four corners of the inner side of ring upper end portion 204, yoke 20 includes four inner vertical extending parts 206 extending perpendicularly downward in a direction parallel to optical axis O.

Accordingly, driving coil 16 also has a substantially quadrangular cylindrical shape that matches the substantially quadrangular cylindrical shape of yoke 20. Specifically, driving coil 16 has an octagonal cylindrical shape with four long side parts 162 disposed to be parallel to and opposite to the four sides of yoke 20, and four short side parts 164 that are opposite to the four corners of yoke 40. Driving coil 16 is attached to the exterior wall of cylindrical part 140 of lens holder 14 in a region on a side closer to upper leaf spring 22 such that driving coil 16 is housed in a space between outer cylinder part 202 of yoke 20 and four inner vertical extending parts 206.

As illustrated in FIG. 2 and FIG. 3, driving magnet 18 illustrated in the drawing is composed of two plate-shaped driving magnet pieces 182 that are disposed at two inner wall surfaces of outer cylinder part 202 of yoke 20 which are opposite to each other in horizontal direction Y such that two plate-shaped driving magnet pieces 182 are opposite to driving coil 16 with a space therebetween. In other words, each plate-shaped driving magnet piece 182 is extended such that the both ends thereof in the horizontal direction are located at a region close to the two sides of yoke 20 opposite to each other in the front-rear direction X. In addition, driving coil 16 is disposed such that it is close to a region around the both ends of each plate-shaped driving magnet piece 182 in the horizontal direction.

With this structure, reduction in the magnetic efficiency of the magnetic circuit can be suppressed.

Each plate-shaped driving magnet piece 182 is magnetized in the radial direction, and the inner periphery side and the outer periphery side thereof are magnetized in different polarities. In the example illustrated in the drawing, each plate-shaped driving magnet piece 182 is magnetized such that the inner periphery side is magnetized to N pole, and the outer periphery side is magnetized to S pole as illustrated in FIG. 3.

The driving mechanism of "moving coil type" is composed of the combination of driving coil 16, two plate-shaped driving magnet pieces 182 and yoke 20.

Outer cylinder part 202 of yoke 20 is composed of front plate part 202F and rear plate part 202B that are opposite to each other in front-rear direction X, and left plate part 202L and right plate part 202R that are opposite to each other in horizontal direction Y. Front plate part 202F includes front cutout part 202a that opens downward, and rear plate part 202B includes rear cutout part 202b that opens downward. Front plate part 202F includes protrusion part 207 that protrudes downward at front cutout part 202a.

On the other hand, base member (actuator base) 12 includes base part 120 having a rectangular ring-shape, and a pair of protruding parts 122 and 123 that are opposite to each other in front-rear direction X and protrude upward in vertical direction Z from base part 120. Here, protruding part 122 provided on the front side is referred to as front protruding part, and protruding part 123 provided on the rear side is referred to as rear protruding part.

Lens holder driving device 10 illustrated in the drawing further includes spacer 30 provided between base member (actuator base) 12 and yoke 20. Spacer 30 is also referred to as inner housing. Spacer (inner housing) 30 has a shape which is substantially housed in the inner wall surface of yoke 20. To be more specific, spacer (inner housing) 30 includes: ring-shaped part 302 having a rectangular external shape provided at the upper portion of the inner wall surface of outer cylinder part 202 of yoke 20; vertical extending part 304 perpendicularly extending downward from the four corners of ring-shaped part 302; and a pair of U-shaped plate parts 305 and 306 extending downward from a pair of the sides of ring-shaped part 302 which are opposite to each other in front-rear direction X. Here, U-shaped plate part 305 provided on the front side is referred to as front U-shaped plate part, and U-shaped plate part 306 provided on the rear side is referred to as rear U-shaped plate part.

The fixing part (12, 30) is composed of the combination of base member (actuator base) 12 and spacer (inner housing) 30.

As illustrated in FIG. 2 and FIG. 4, in a region around front cutout part 202a of yoke 20, front protruding part 122 of base member 12 and front U-shaped plate part 305 of spacer (inner housing) 30 are engaged with each other (in engagement). In addition, in a region around rear cutout part 202b of yoke 20, rear protruding part 123 of base member 12 and rear U-shaped plate part 306 of spacer (inner housing) 30 are engaged with each other (in engagement).

It is to be noted that front protruding part 122 of base member 12 includes rectangular hole 122a through which hole sensor 344 serving as a position detection device described later is inserted. In addition, cylindrical part 140 of lens holder 14 includes a pair of housing parts 140a for housing a pair of sensor magnets 342a and 342b described later at lower portions of the exterior walls opposite to each other in front-rear direction X with the Z axis (optical axis O) as the center.

Lens holder driving device 10 illustrated in the drawing further includes position detection part 34 that detects the position of lens holder 14.

As illustrated in FIG. 2 and FIG. 4, position detection part 34 is provided in a region on a side closer to lower leaf spring 24. To be more specific, position detection part 34 includes one of the pair of sensor magnets 342a and 342b housed in the above-mentioned pair of housing parts 140a of cylindrical part 140 of lens holder 14 (in the example illustrated in the drawing, front side sensor magnet 342a), and hole sensor 344 that is inserted in rectangular hole 122a of base member 12 in such a manner as to be opposite to sensor magnet 342a.

Sensor magnets 342a and 342b are magnetized in the direction of optical axis O, and the top surface side and the bottom surface side thereof are magnetized in different polarities. In the example illustrated in the drawing, sensor magnets 342a and 342b are magnetized such that the top surface is magnetized to S pole, and the bottom surface is magnetized to N pole as illustrated in FIG. 4.

In the present embodiment, a permanent magnet whose Curie point is 400° C. or above is used as sensor magnets 342a and 342b. Examples of such a permanent magnet include a samarium-cobalt magnet, a ferrite magnet, and an alnico magnet.

It is to be noted that the polarities of two plate-shaped driving magnet pieces 182 and the polarities of the pair of sensor magnets 342a and 342b are not limited to the polarities illustrated in FIG. 3 and FIG. 4, and may be opposite to each other. That is, plate-shaped driving magnet pieces 182 may be magnetized such that the inner periphery side is magnetized to S pole, and the outer periphery side is magnetized to N pole, and, sensor magnets 342a and 342b may be magnetized such that the top surface side is magnetized to N pole, and the bottom surface side is magnetized to S pole.

It is to be noted that, as illustrated in FIG. 2 and FIG. 4, hole sensor 344 is installed on flexible printed circuit (FPC) 40. As illustrated in FIG. 1 and FIG. 4, at front opening part 202a of yoke 20, flexible printed circuit (FPC) 40 is attached to the exterior wall of front protruding part 122 of base member 12 in a state where it is inserted in protrusion part 207 of yoke 20. As illustrated in FIG. 1, flexible printed circuit (FPC) 40 is provided with a pair of cone-shaped depressions 401 at both end side portions thereof in horizontal direction Y.

It is to be noted that the pair of sensor magnets 342a and 342b are respectively housed in the pair of housing parts 140a formed at lower portions of the exterior walls opposite to each other in front-rear direction X with the Z axis (optical axis O) as the center in cylindrical part 140 of lens holder 14 for the purpose of maintaining the balance between the moving state and the stopping state of lens holder 14, achieving uniform weight disposition around the Z axis (optical axis O), and equalizing the magnetic interference force (resilience) with plate-shaped driving magnet piece 182. Accordingly, assuming that one sensor magnet 342a and plate-shaped driving magnet piece 182 are separated from each other by a certain distance and that the magnetic interference has no influence, the other sensor magnet 342b that is not opposite to hole sensor 344 can be replaced by a weight having a similar weight which is not magnetized.

Upper leaf spring (front spring) 22 is disposed on the upper side (front side) of lens holder 14 in the direction of the optical axis O, and lower leaf spring (rear spring) 24 is disposed on the lower side (rear side) of lens holder 14 in the direction of optical axis O.

Figure 5:
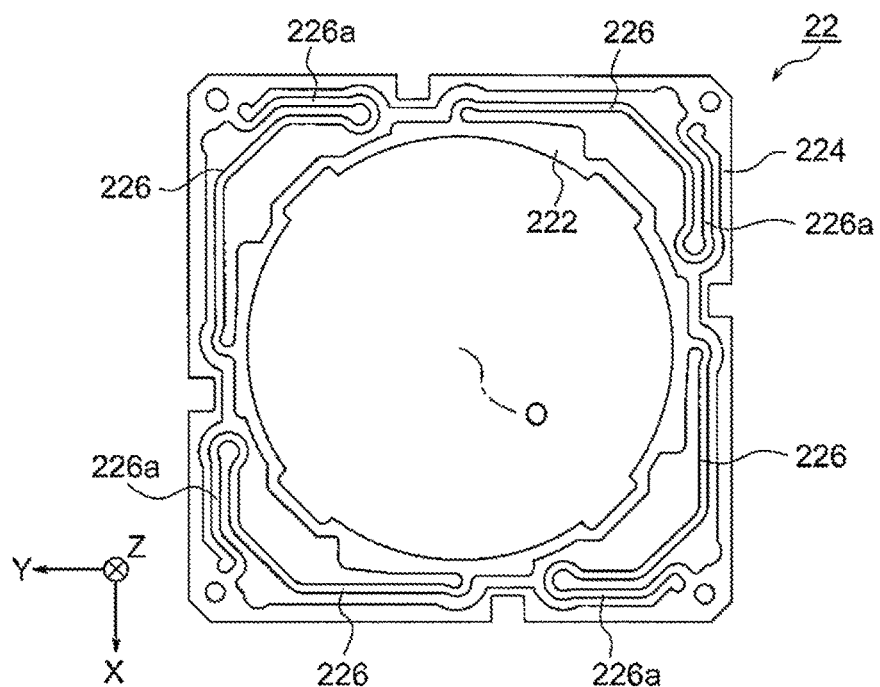
FIG. 5 is a plan view illustrating a shape of an upper leaf spring used for the lens holder driving device illustrated in FIG. 1 as viewed from a base member.
Figure 6:
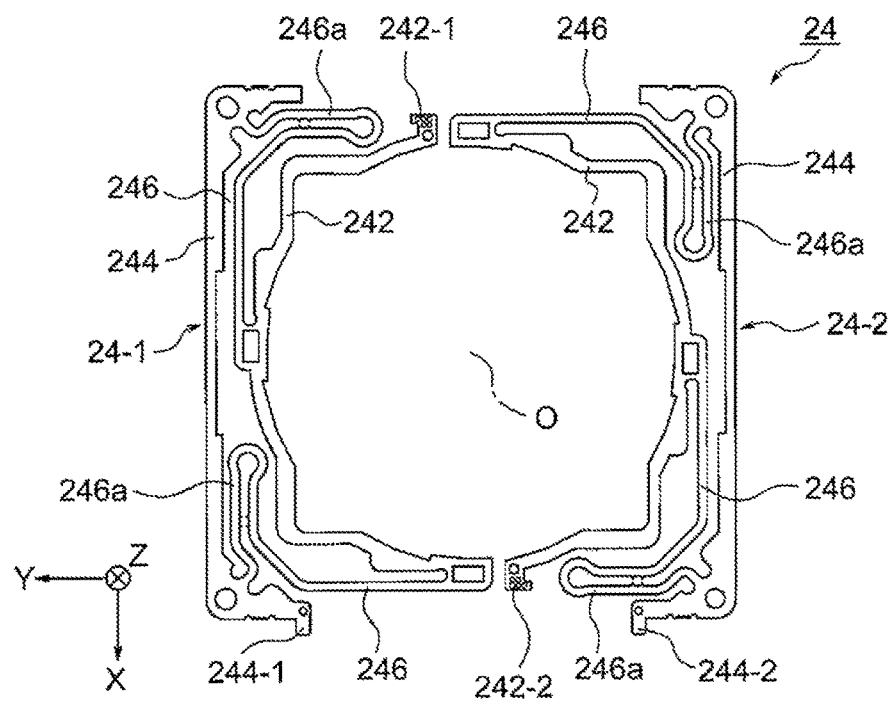
FIG. 6 is a plan view illustrating a shape of a lower leaf spring used for the lens holder driving device illustrated in FIG. 1 as viewed from base member.
Figure 7:
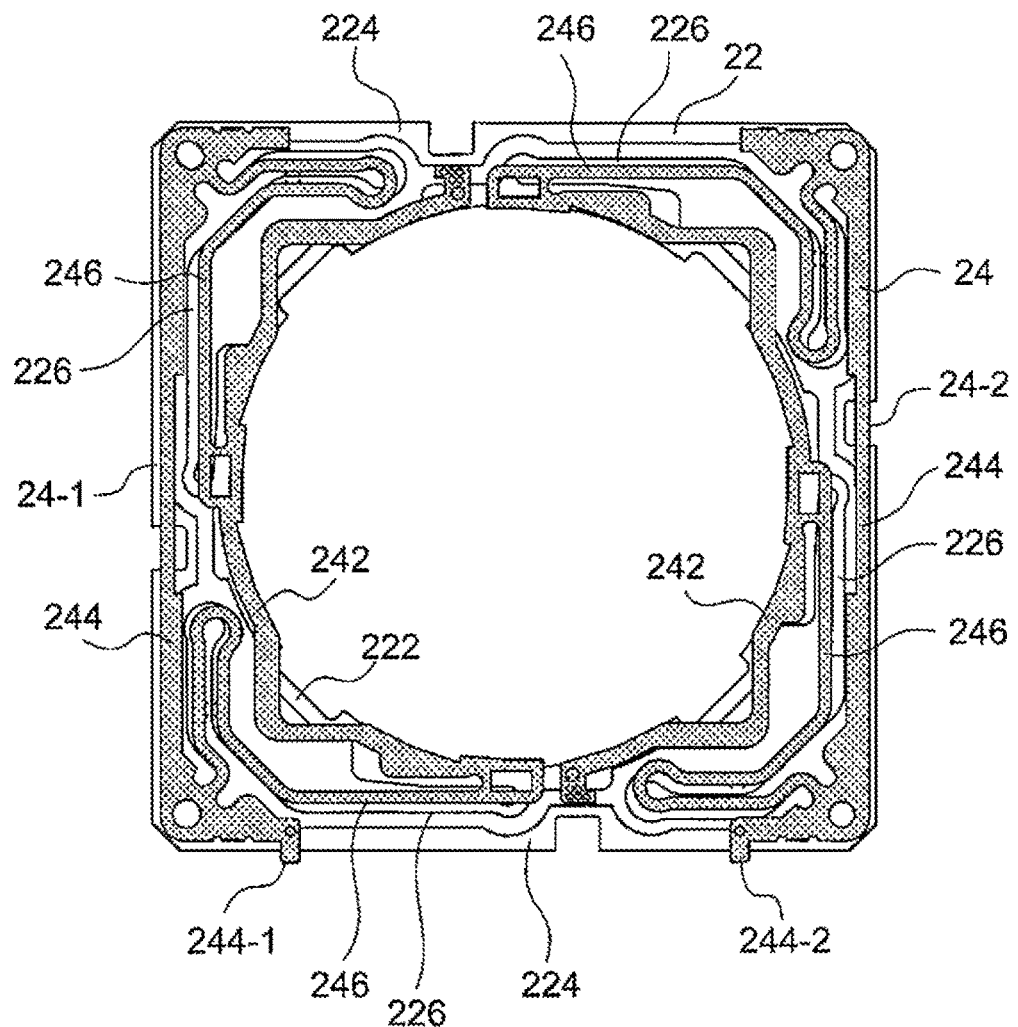
FIG. 7 is a plan view illustrating a relationship between the upper leaf spring illustrated in FIG. 5 and the lower leaf spring illustrated in FIG. 6.

With reference to FIG. 5 to FIG. 7, the shapes of upper leaf spring 22 and lower leaf spring 24 and their relationship are described.

FIG. 5 is a plan view illustrating a shape of upper leaf spring 22 as viewed from base member 12. FIG. 6 is a plan view illustrating a shape of lower leaf spring 24 as viewed from base member 12. FIG. 7 is a plan view illustrating a relationship between upper leaf spring 22 and lower leaf spring 24.

First, with reference to FIG. 5, the shape of upper leaf spring 22 is described.

Upper leaf spring 22 includes upper inner periphery end part 222 that is attached to an upper end portion of lens holder 14, and upper outer periphery end part 224 that is attached to ring-shaped part 302 of spacer 30. Four upper arm parts 226 are provided between upper inner periphery end part 222 and upper outer periphery end part 224 along the circumferential direction. Each upper arm part 226 connects upper inner periphery end part 222 and upper outer periphery end part 224. Each upper arm part 226 has a U-turn-shaped portion 226a that is folded-back by 180 degrees.

Next, with reference to FIG. 6, the shape of lower leaf spring 24 is described.

Lower leaf spring 24 includes lower inner periphery end part 242 that is attached to a lower end portion of lens holder 14, and lower outer periphery end part 244 that is attached to actuator base (base member) 12. Four lower arm parts 246 are provided between lower inner periphery end part 242 and lower outer periphery end part 244 along the circumferential direction. Each lower arm part 246 connects lower inner periphery end part 242 and lower outer periphery end part 244. Each lower arm part 246 has U-turn-shaped portion 246a that is folded-back by 180 degrees.

Next, with reference to FIG. 7, the relationship between upper leaf spring 22 and lower leaf spring 24 is described.

As illustrated in FIG. 7, four upper arm parts 226 of upper leaf spring 22 and four lower arm parts 246 of lower leaf spring 24 have substantially the same shape in plan view.

Next, the way for feeding power to driving coil 16 is described.

As illustrated in FIG. 6, for the purpose of achieving power feeding to driving coil 18 through lower leaf spring 24, lower leaf spring 24 is composed of first and second spring pieces 24-1 and 24-2 that are electrically isolated from each other. The shapes of first leaf spring piece 24-1 and second leaf spring piece 24-2 are substantially rotationally symmetrical about optical axis O of the lens.

First leaf spring piece 24-1 has first external connection terminal 244-1 protruding forward from lower outer periphery end part 244. Second leaf spring piece 24-2 has second external connection terminal 244-2 protruding forward from lower outer periphery end part 244.

On the other hand, first leaf spring piece 24-1 has first terminal part 242-1 protruding rearward from lower inner periphery end part 242. Second leaf spring piece 24-2 has second terminal part 242-2 protruding forward from lower inner periphery end part 242. First terminal part 242-1 is electrically connected to a first terminal end part (not illustrated) of driving coil 18 by soldering. Second terminal part 242-2 is electrically connected to a second terminal end part (not illustrated) of driving coil 16 by soldering.

As illustrated in FIG. 1, first and second external connection terminals 244-1 and 244-2 of lower leaf spring 24 are provided to protrude outward from the pair of cone-shaped depressions 401 of flexible printed circuit (FPC) 40.

Accordingly, flexible printed circuit (FPC) 40 is electrically connected with the first terminal end part of driving coil 16 through first external connection terminal 244-1 of lower leaf spring 24, and first leaf spring piece 24-1 and first terminal part 242-1 of lower leaf spring 24. Likewise, flexible printed circuit (FPC) 40 is electrically connected with the second terminal end part of driving coil 16 through second external connection terminal 244-2 of lower leaf spring 24, and second leaf spring piece 24-2 and second terminal part 242-2 of lower leaf spring 24.

In this manner, power is fed from flexible printed circuit (FPC) 40 to driving coil 16 through lower leaf spring 24.

When coil 16 is energized, a driving force in the direction of optical axis O is generated in lens holder 14 (lens barrel 11) with the interaction between the magnetic field of driving magnet 18 and the magnetic field of the current flowing through driving coil 16, and the driving force and the restoration force (biasing force) of the pair of leaf springs 22 and 24 are balanced, whereby the position of lens holder 14 (lens barrel 11) in the direction of optical axis O can be adjusted.

Figures 8A, 8B:
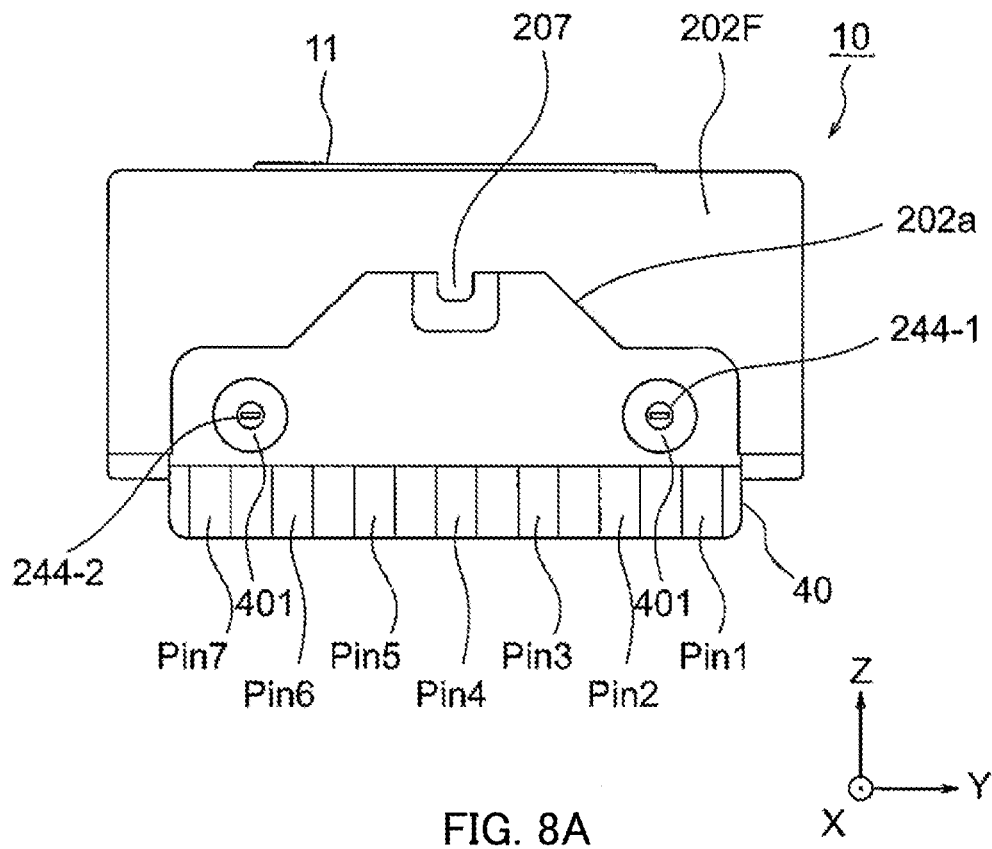
FIGS. 8A and 8B are drawings for describing a conductor pattern formed in a flexible printed circuit (FPC) used for the lens holder driving device illustrated in FIG. 1, FIG. 8A being a front view of the lens holder driving device.

With reference to FIGS. 8A and 8B, the conductor pattern of the terminal part formed in flexible printed circuit (FPC) 40 is described. FIG. 8A is a front view of lens holder driving device 10, and FIG. 8B illustrates a relationship between seven terminals of the conductor pattern of flexible printed circuit (FPC) 40 and terminals which are connected to the seven terminals.

As illustrated in FIG. 8A, flexible printed circuit (FPC) 40 includes, as the conductor pattern, first to seventh terminals Pin1 to Pin7 which are disposed from the right side to the left side.

As illustrated in FIG. 8B, first terminal Pin1 is connected with ACT Terminal (+) that is first external connection terminal 244-1 of lower leaf spring 24, second terminal Pin2 is connected with first output terminal Hall output (−) of hole sensor 344, and third terminal Pin3 is connected with first input terminal Hall input (+) of hole sensor 344. Fourth terminal Pin4 is connected with ground terminal GND. Fifth terminal Pin5 is connected with second output terminal Hall output (+) of hole sensor 344, sixth terminal Pin6 is connected with first input terminal Hall input (−) of Hall device 344, and seventh terminal Pin7 is connected with ACT Terminal (−) that is second external connection terminal 244-2 of lower leaf spring 24.

Next, with reference to FIG. 9 to FIG. 12, details of the configuration of lower leaf spring 24 are described.

Figure 9:
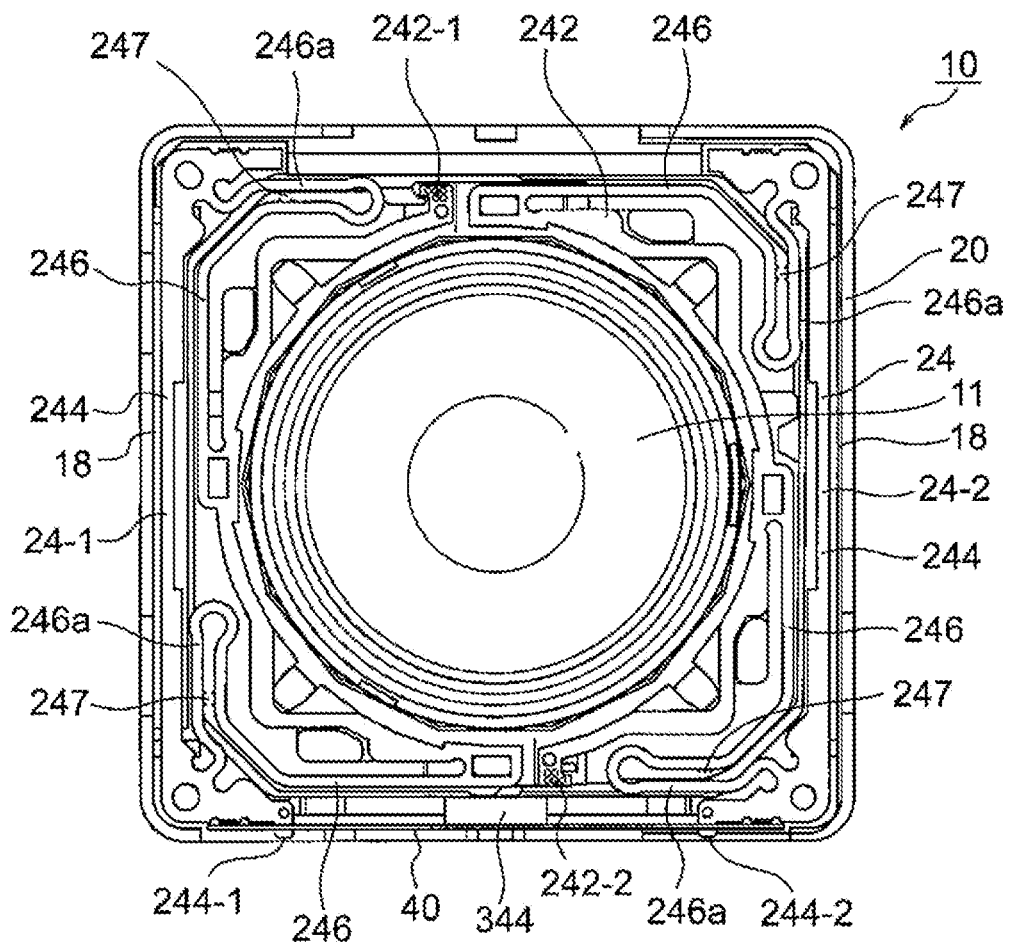
FIG. 9 is a plan view illustrating an assembly of the lens holder driving device illustrated in FIG. 1 as viewed from the base member, and illustrates a state before an elastic adhesive agent is provided (applied) to the lower leaf spring.
Figure 10:
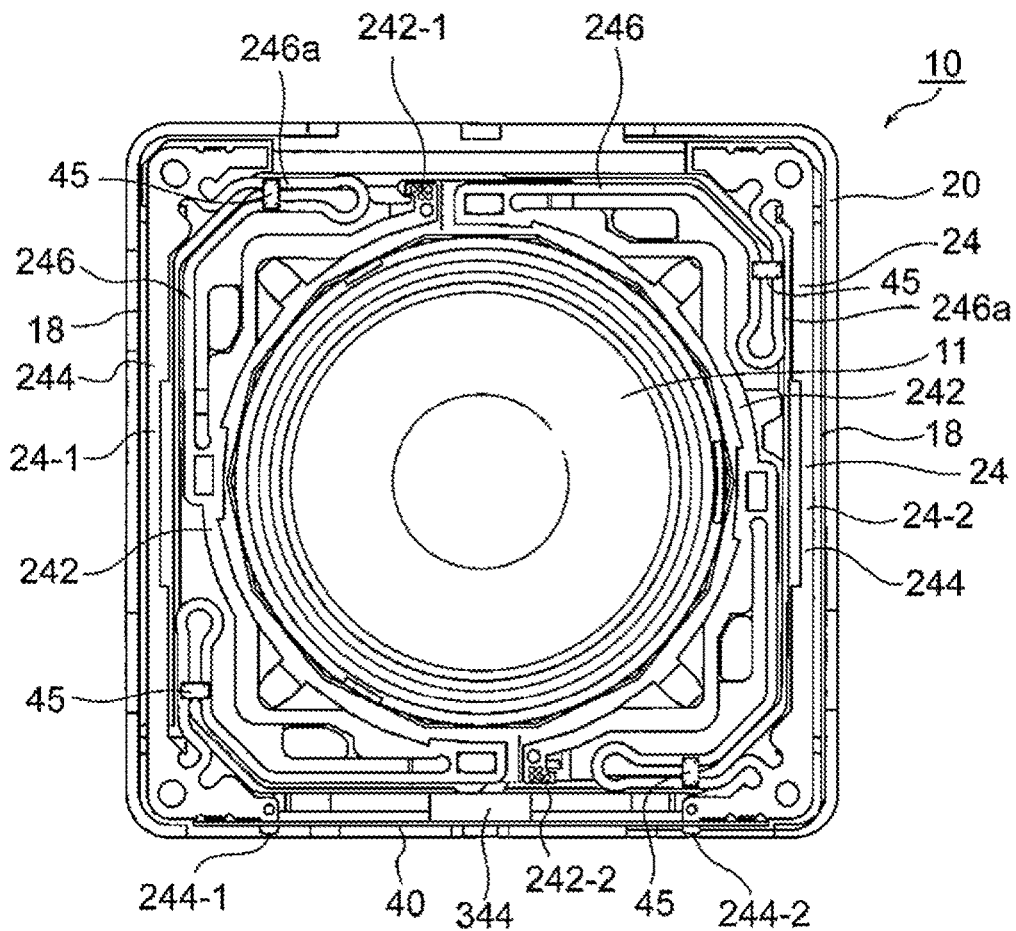
FIG. 10 is a plan view illustrating the assembly of the lens holder driving device illustrated in FIG. 1 as viewed from the base member, and illustrates a state after the elastic adhesive agent is provided (applied) to the lower leaf spring.
Figure 10:
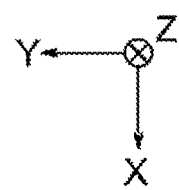
Figure 11:
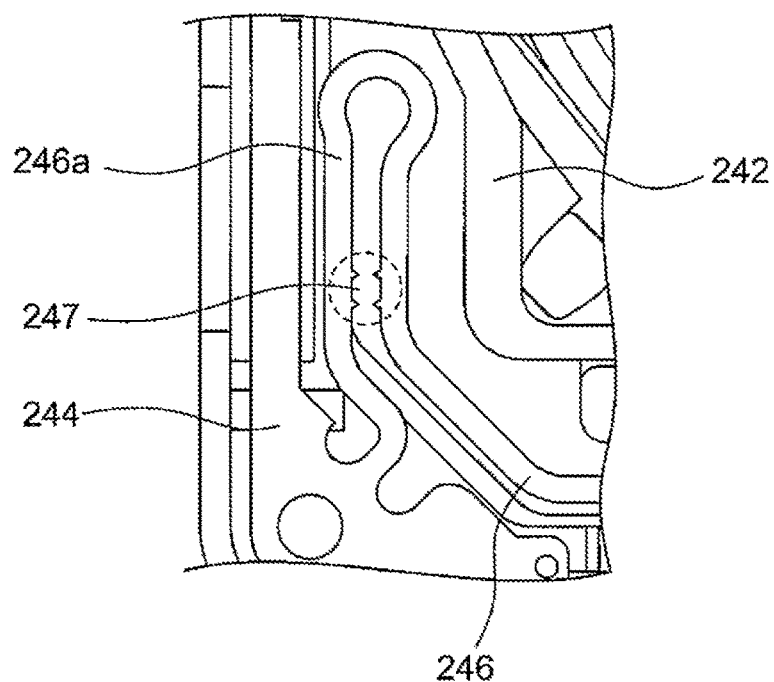
FIG. 11 is a partially enlarged view illustrating a part of FIG. 9 in an enlarged manner.

FIG. 9 and FIG. 10 are plan views of the assembly of lens holder driving device 10 as viewed from base member 12. FIG. 9 illustrates a state before elastic adhesive agent 45 described later is provided (applied) to lower leaf spring 24, and FIG. 10 illustrates a state after four elastic adhesive agents 45 are provided (applied) to lower leaf spring 24. FIG. 11 is a partially enlarged view illustrating a part of FIG. 9 in an enlarged manner, and FIG. 12 is a partially enlarged view illustrating a part of FIG. 10 in an enlarged manner.

Figure 12:
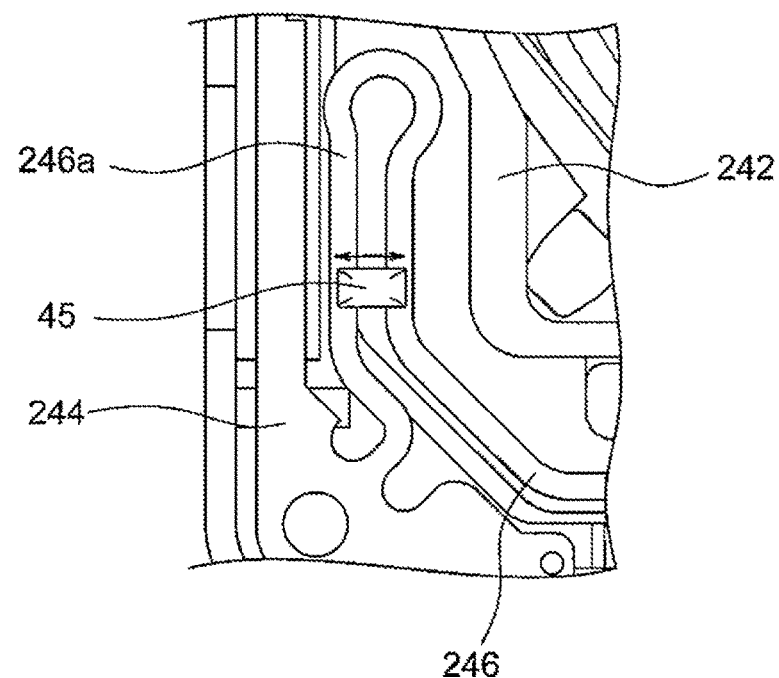
FIG. 12 is a partially enlarged view illustrating a part of FIG. 10 in an enlarged manner.

As illustrated in FIG. 10 and FIG. 12, lower leaf spring 24 is provided with elastic adhesive agents 45 at U-turn-shaped portions 246a of four lower arm parts 246. Each elastic adhesive agent 45 is provided as a bridge between opposite portions of U-turn-shaped portion 246a. Four elastic adhesive agents 45 are provided at equal angular intervals in the circumferential direction around optical axis O.

It is to be noted that elastic adhesive agent 45 is composed of a stretchable and flexible resin. In this example, as elastic adhesive agent 45, a moisture-curable adhesive agent selected from among silicone-based adhesive agent and silyl group terminated polymer-based adhesive agent is used.

As illustrated in FIG. 9 and FIG. 11, U-turn-shaped portions 246a of four lower arm parts 246 have positioning protrusions 247 for facilitating the bridging of elastic adhesive agent 45 with its surface tension at the above-mentioned opposite portions (that is, the portions where elastic adhesive agent 45 is applied).

By applying elastic adhesive agent 45 at U-turn-shaped portions 246a of four lower arm parts 246 in the above-mentioned manner, lens holder driving device 10 according to the present embodiment suppresses the secondary resonance (sub resonance) which is sway in the arrow direction of FIG. 12. In addition, elastic adhesive agent 45 is provided at U-turn-shaped portions 246a of four lower arm parts 246, and therefore does not limit the original stroke of lens holder 14. Further, since the secondary resonance (sub resonance) can be suppressed, the feedback control described later can be prevented from being negatively influenced.

Next, with reference to FIG. 13A to FIG. 14C, an effect of lens holder driving device 10 according to the present embodiment is described.

Figure 13A:
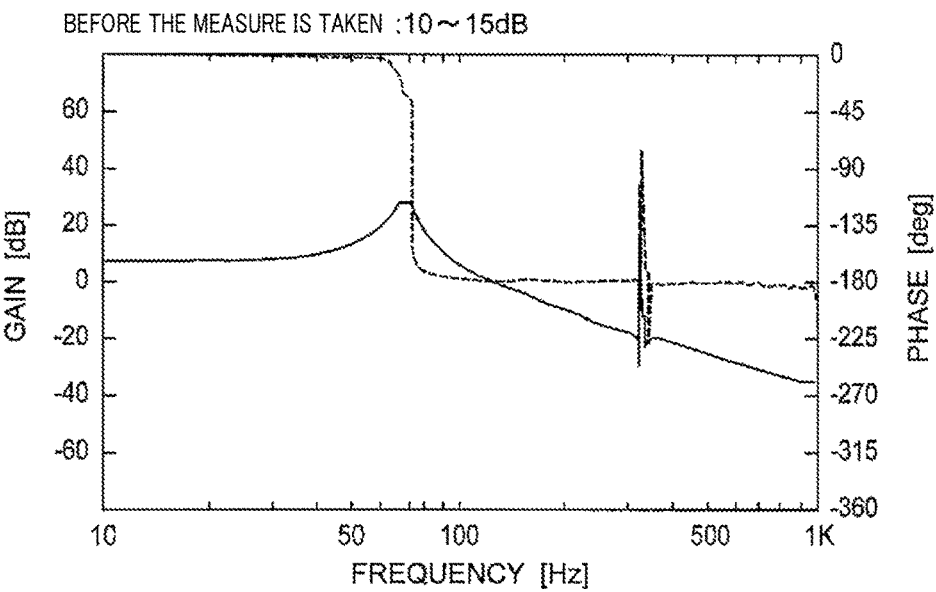
FIGS. 13A and 13B are drawings for describing an effect of the lens holder driving device illustrated in FIG. 1, FIG. 13A being a Bode diagram showing frequency response characteristics of the lens holder driving device before application of the elastic adhesive agent (before the measure is taken)
Figure 13B:
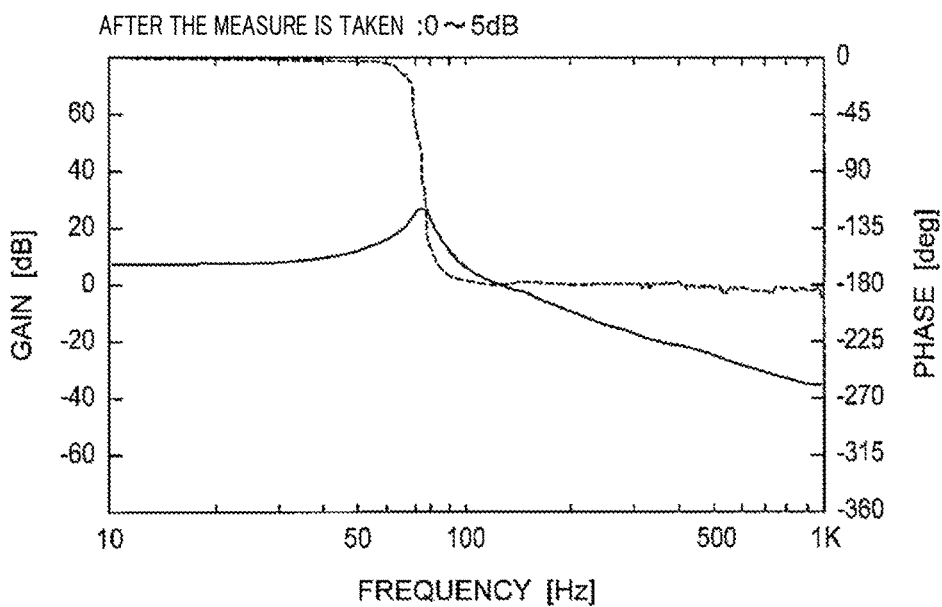
Figure 14A:
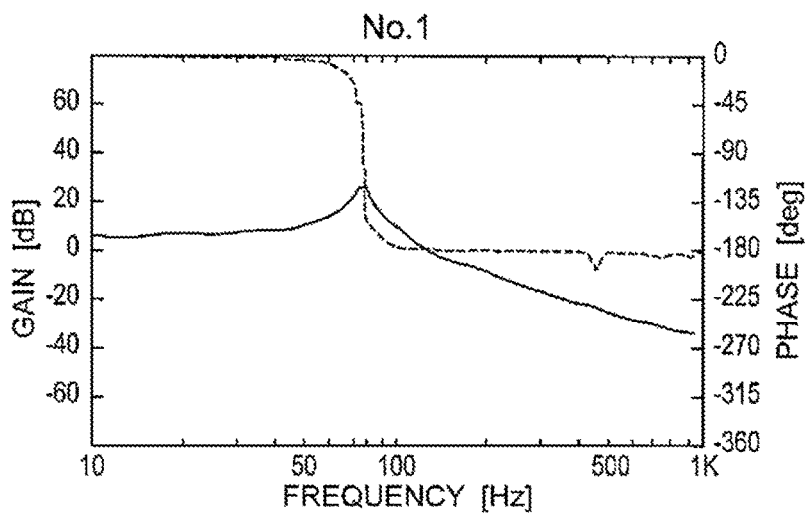
FIGS. 14A to 14C are drawings for describing an effect of the lens holder driving device illustrated in FIG. 1, and are Bode diagrams showing frequency response characteristics of three lens holder driving devices (No1, No2 and No3) according to the present embodiment after application of the elastic adhesive agent.
Figure 14B:
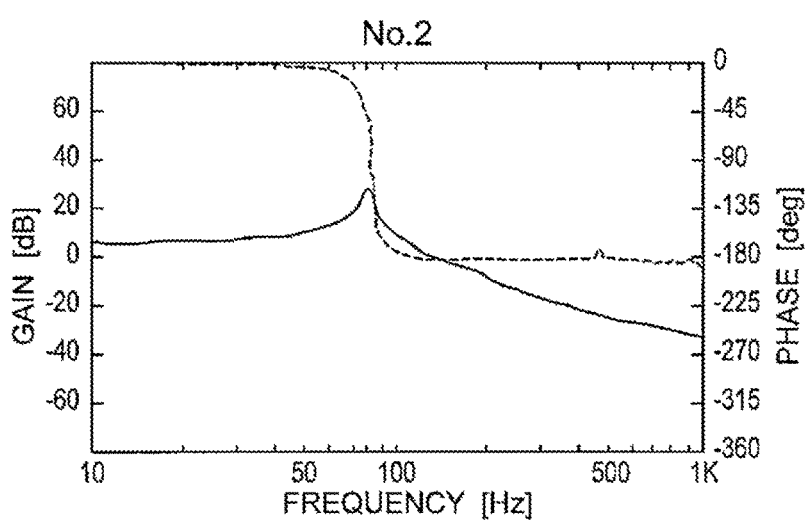
Figure 14C:
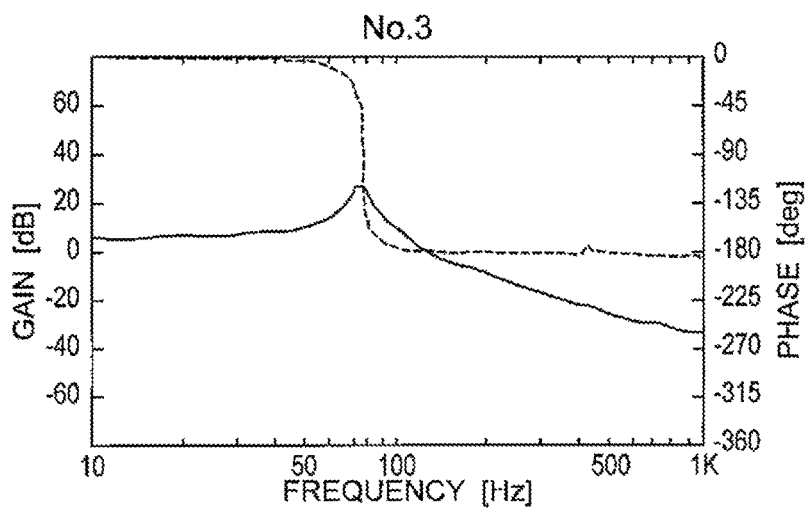

FIG. 13A is a Bode diagram showing frequency response characteristics of lens holder driving device 10 before application of elastic adhesive agent 45 (before the measure is taken), and FIG. 13B is a Bode diagram showing frequency response characteristics of lens holder driving device 10 according to the present embodiment after application of elastic adhesive agent 45 (after the measure is taken). In addition, FIGS. 14A to 14C are Bode diagrams showing frequency response characteristics of three lens holder driving devices 10 according to the present embodiment (No1, No2 and No3) after application of elastic adhesive agent 45.

In FIG. 13A to FIG. 14C, the abscissa indicates frequency [Hz], the left ordinate indicates gain [dB], and the right ordinate indicates phase [deg]. In addition, in FIG. 13A to FIG. 14C, the solid line indicates a gain characteristic curve, and the broken line indicates a phase characteristic curve.

As illustrated in FIG. 13A, in a state before the measure is taken, the main resonance (primary resonance) is generated in the frequency range of approximately 70 Hz, and the sub resonance (secondary resonance) of 10 to 15 dB is generated in the frequency range of 300 Hz to 350 Hz.

In contrast, as can be seen in FIG. 13B, in a state after the measure is taken, the main resonance (primary resonance) is generated in the frequency range of approximately 70 Hz, but only the sub resonance (secondary resonance) of about 0 to 5 dB is generated in the frequency range of 300 Hz to 350 Hz.

Accordingly, lens holder driving device 10 according to the embodiment of the present invention (after the measure is taken) can reduce the sub resonance (secondary resonance) of the frequency range of 300 Hz to 350 Hz by approximately 10 dB in comparison with the state before the measure is taken.

In addition, as can be seen in FIGS. 14A to 14C, in each of three (No1, No2 and No3) lens holder driving devices 10, the Q value of the secondary resonance (sub resonance) of frequencies around 330 Hz is 3 dB or smaller, and the phase difference is limited to ±10 degrees or smaller. Thus, significant improvement effect is achieved.

It is to be noted that elastic adhesive agent 45 can provide its function with no problem even when washing solution is present. Accordingly, as usual, lens holder driving device 10 can be washed after lens holder driving device 10 is assembled and the quality can be maintained.

In addition, while stretchable and flexible resin is provided to lower leaf spring 24 by applying elastic adhesive agent 45 in this example, the present invention is not limited to this. For example, the stretchable and flexible resin may be provided to lower leaf spring 24 by bonding an elasticity sheet of such a stretchable and flexible resin to lower leaf spring 24 with a double-sided tape. Alternatively, the stretchable and flexible resin may be provided to lower leaf spring 24 by molding lower leaf spring 24 and stretchable and flexible resin in two colors by outsert molding. Further, stretchable and flexible resin may also be provided to lower leaf spring 24 by UV curing a photoresist. In addition, the place where the stretchable and flexible resin is provided is not limited to lower leaf spring 24, and it is also effective to provide the stretchable and flexible resin at upper leaf spring 22 or both of leaf springs 22 and 24.

Lens holder driving device 10 according to the present embodiment controls the position of lens holder 14 in the direction of optical axis O by feedback control as described next.

First, a driving current is supplied to driving coil 16 to move lens holder 14 in the direction of optical axis O, and the position of lens holder 14 in the direction of optical axis O (detection position) and the detection value detected at hole sensor 344 of position detection part 34 are measured. In this manner, the relationship of the driving current, the detection position, and the detection value is determined. The driving current and the detection position correspond to each other in one-to-one relationship. Accordingly, when moving lens holder 14 to a desired target position (a position in the direction of optical axis O), it suffices to supply driving coil 16 with a driving current corresponding to the target position.

To achieve conversion of a detection value into a detection position, the relationship between the detection value and the detection position (one-to-one relationship) is stored in a ROM (read-only memory). Accordingly, the ROM serves as a conversion part that converts a detection value into a detection position.

A control part (not illustrated) for achieving feedback control determines a driving current required for moving lens holder 14 to a target position on the basis of an image signal of the imaging device and a detection value detected by hole sensor 344, and supplies the determined driving current to driving coil 16.

The control part includes the above-mentioned conversion part (ROM), a target position calculation part, a comparison part, and an operation part. The target position calculation part calculates a target position (focusing position) of lens holder 14 based on an image signal of the imaging device. Here, the focusing position is a position of lens holder 14 where the contrast value of a captured image obtained by processing of an image signal is optimized. The comparison part compares the target position and the detection position, and outputs a control deviation. The operation part supplies an operation amount at which the control deviation is zero as a driving current to driving coil 16.

In the present embodiment, since the secondary resonance (sub resonance) can be suppressed as described above, feedback control is not negatively influenced. It should be noted that the present invention is also applicable to the case where no feedback control is performed.

Figure 15:
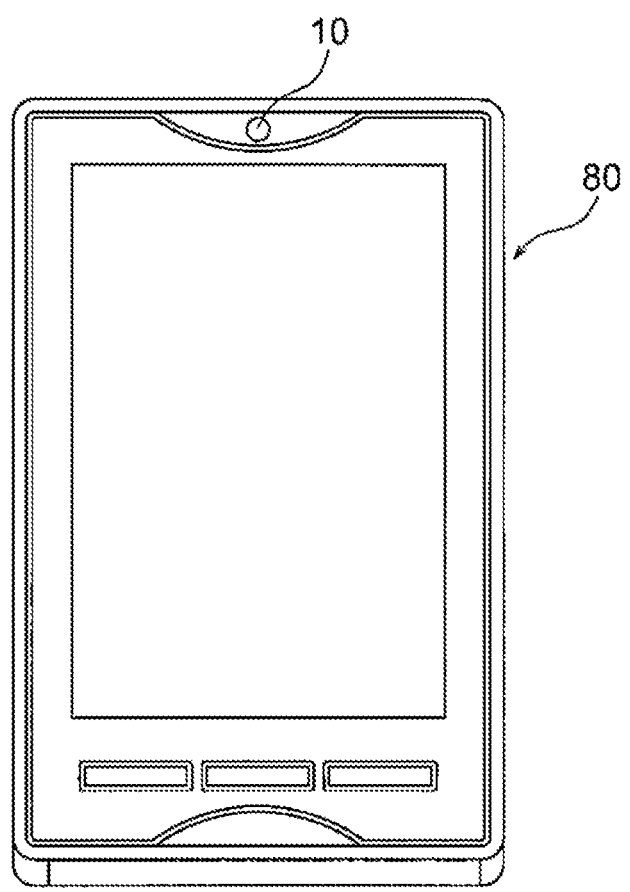
FIG. 15 is a perspective view illustrating a camera-equipped mobile terminal in which the lens holder driving device illustrated in FIG. 1 is installed.

FIG. 15 is a perspective view illustrating camera-equipped mobile terminal 80 in which lens holder driving device 10 is installed. Camera-equipped mobile terminal 80 illustrated in the drawing is composed of a smartphone. Lens holder driving device 10 is attached at a predetermined position of camera-equipped mobile terminal 80. With this structure, the user can capture an image by using camera-equipped mobile terminal 80.

While camera-equipped mobile terminal 80 is composed of a smartphone in this example, the camera-equipped mobile terminal may be a camera-equipped mobile phone, a note-type personal computer, a tablet-type personal computer, a mobile game machine, a Web camera, or an in-vehicle camera.

An exemplary mode of the present invention is described below.

In the exemplary mode of the present invention, a lens holder driving device (10) includes: a lens holder (14) to which a lens barrel (11) is attachable; a fixing part (12, 30) disposed at an outer periphery of the lens holder (14); a driving mechanism (16, 18, 20) for driving the lens holder (14) in a direction of an optical axis (O) of a lens; an upper leaf spring (22) configured to couple the lens holder (14) and the fixing part (12, 30) at an upper part thereof; and a lower leaf spring (24) configured to couple the lens holder (14) and the fixing part (12, 30) at a lower part thereof. Each of the upper leaf spring (22) and the lower leaf spring (24) includes an inner periphery side end part (222; 242) fixed to the lens holder (14), an outer periphery side end part (224; 244) fixed to the fixing part (12, 30), and a plurality of arm parts (226; 246) provided along a circumferential direction for coupling between the inner periphery side end part (222; 242) and the outer periphery side end part (224; 244). The arm parts (226) of the upper leaf spring (22) and the arm parts (246) of the lower leaf spring (24) have substantially the same shape in plan view. Each of the arm parts (226; 246) includes at least one U-turn-shaped portion (226a; 246a) having a folded-back shape; and at least one of the upper leaf spring (22) and the lower leaf spring (24) includes at least one stretchable and flexible resin (45) provided as a bridge between opposite portions in the U-turn-shaped portion (226a; 246a) of the arm parts (226; 246).

In the lens holder driving device (10), desirably, a plurality of the stretchable and flexible resins (45) are provided at equal angular intervals in a circumferential direction around the optical axis (O). Preferably, the resin (45) is composed of an elastic adhesive agent. Preferably, the elastic adhesive agent (45) is composed of a moisture-curable elastic adhesive agent. Preferably, the moisture-curable elastic adhesive agent (45) is selected from among a silicone-based adhesive agent, and a silyl group terminated polymer-based adhesive agent. Preferably, the U-turn-shaped portion (246a) of the arm parts (246) includes a positioning protrusion (247) configured to facilitate bridging of the resin (45) with a surface tension of the resin (45) at the opposite portions.

In addition, In the lens holder driving device (10), the fixing part may include a base member (12) disposed on a lower side of the lens holder (14). In this case, the driving mechanism may include: a driving coil (16) that is fixed at a periphery of the lens holder (14) in a region on a side closer to the other of the upper leaf spring (22) and the lower leaf spring (24), a yoke (20) that has a substantially quadrangular cylindrical shape and is uprightly provided on the base member (12), and a driving magnet (18) disposed at a pair of inner wall surfaces of the yoke (20) which are opposite to each other in a first direction (Y) orthogonal to the direction of the optical axis (O) such that the driving magnet (18) is opposite to the driving coil (16). The lens holder driving device (10) may further include a position detection part (34) configured to detect a position of the lens holder (14) in a region on a side closer to one of the upper leaf spring (22) and the lower leaf spring (24). The position detection part (34) may include: a sensor magnet (342a) as one of a pair of sensor magnets (342a, 342b) attached on corresponding outer peripheral surfaces of the lens holder (14) in a second direction (X) orthogonal to the direction of the optical axis (O) and the first direction (Y); and a magnetic detection device (344) provided to the base member (12) such that the magnetic detection device (344) is opposite to the sensor magnet (342a).

According to another exemplary mode of the present invention, a camera-equipped mobile terminal (80) in which the above-mentioned lens holder driving device (10) is installed can be obtained.

It is to be noted that the reference numerals in parentheses are merely examples intended for convenience of description of the present invention, and the present invention is not limited thereto.

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, while each of the arm parts of the upper leaf spring and the lower leaf spring includes only one U-turn-shaped portion in the embodiment, a plurality of U-turn-shaped portions may be provided. In addition, while the stretchable and flexible resin is provided at the U-turn-shaped portion of the plurality of lower arm parts of the lower leaf spring in the embodiment since the position detection part is provided in a region around lower leaf spring, the stretchable and flexible resin may be provided at the U-turn-shaped portion of the plurality of lower arm parts of the upper leaf spring in the case where the position detection part is provided in a region around the upper leaf spring. In addition, the stretchable and flexible resin may be provided at the U-turn-shaped portion of the plurality of arm parts of both of the lower leaf spring and the upper leaf spring regardless of the position of the position detection part. Further, while one stretchable and flexible resin is provided at each U-turn-shaped portion in the embodiment, a plurality of stretchable and flexible resins may be provided at each U-turn-shaped portion.

Further, while each of the upper leaf spring and the lower leaf spring includes four arm parts between the inner periphery side end part and the outer periphery side end part in the embodiment, the present invention is generally applicable to a leaf spring including a plurality of arm parts along the circumferential direction which are symmetrical about the optical axis.

Furthermore, the present invention is not limited to the lens holder driving device 10 of the "moving coil type" according to the embodiment, and the present invention is also applicable to a lens holder driving device of "moving magnet type."

This application is entitled to and claims the benefit of Japanese Patent Application No. 2014-123210 filed on Jun. 16, 2014, the disclosure each of which including the specification, drawings and abstract is incorporated herein by reference in its entirety.

REFERENCE SIGNS LIST

10 Lens holder driving device
11 Lens barrel
12 Base member (actuator base)
120 Base part
122 Front protruding part
122a Rectangular hole
123 Rear protruding part
14 Lens holder
140 Cylindrical part
140a Housing part
16 Driving coil
162 Long side part
16 Four short side parts
18 driving magnet
182 Plate-shaped driving magnet piece
20 Yoke
202 Outer cylinder part
202a Front cutout part
202b Rear cutout part
202F Front plate part
202B Rear plate part
202L Left plate part
202R right plate part
204 Ring-shaped upper end part
206 Inner vertical extending part
207 Protrusion part
22 Upper leaf spring
222 Upper inner periphery end part
224 Upper outer periphery end part
226 Upper arm part
226a U-turn-shaped portion
24 Lower leaf spring
24-1 First spring piece
24-2 Second spring piece 242 Lower inner periphery end part
242-1 First terminal part
242-2 Second terminal part
244 Lower outer periphery end part
244-1 First external connection terminal
244-2 Second external connection terminal
246 Lower arm part
246a U-turn-shaped portion
247 Positioning protrusion
30 Spacer (inner housing)
302 Ring-shaped part
304 Vertical extending part
305 Front U-shaped plate part
306 Rear U-shaped plate part
34 Position detection part
342a Sensor magnet
342b Sensor magnet
344 Hole sensor (magnetic detection device)
40 Flexible printed circuit (FPC)
401 Cone-shaped depression
45 Elastic adhesive agent (stretchable and flexible resin)
80 Camera-equipped mobile terminal (smartphone)
O Optical axis
X Front-rear direction (second direction)
Y Horizontal direction (first direction)
Z Vertical direction

The invention claimed is:

1. A lens holder driving device comprising:
a lens holder to which a lens barrel is attachable;
a fixing part disposed at an outer periphery of the lens holder;
a driving mechanism for driving the lens holder in a direction of an optical axis of a lens;
an upper leaf spring configured to couple the lens holder and the fixing part at an upper part thereof; and
a lower leaf spring configured to couple the lens holder and the fixing part at a lower part thereof, wherein:
each of the upper leaf spring and the lower leaf spring includes:
an inner periphery side end part fixed to the lens holder,
an outer periphery side end part fixed to the fixing part, and
a plurality of arm parts provided along a circumferential direction for coupling between the inner periphery side end part and the outer periphery side end part;
the arm parts of the upper leaf spring and the arm parts of the lower leaf spring have substantially the same shape in a plan view;
each of the arm parts includes at least one folded-back portion having a U-turn shape;
at least one of the upper leaf spring and the lower leaf spring includes at least one stretchable and flexible resin which is provided as a bridge between opposite portions in the folded-back portion of the arm parts and which is suppressing a sway of the folded-back portion in a direction where the opposite portions in the folded-back portion face each other; and
the folded-back portion of the arm parts includes at least one pair of positioning protrusions disposed between the opposite portions and extending from each of the opposite portions toward each other and configured to facilitate bridging of the resin with a surface tension of the resin.

2. The lens holder driving device according to claim 1, wherein a plurality of the stretchable and flexible resins are provided at equal angular intervals in a circumferential direction around the optical axis.

3. The lens holder driving device according to claim 2, wherein the resin is composed of an elastic adhesive agent.

4. The lens holder driving device according to claim 3, wherein the elastic adhesive agent is composed of a moisture-curable elastic adhesive agent.

5. The lens holder driving device according to claim 4, wherein the moisture-curable elastic adhesive agent is selected from among a silicone based adhesive agent, and a silyl group terminated polymer-based adhesive agent.

6. The lens holder driving device according to claim 1, wherein:
the fixing part includes a base member disposed on a lower side of the lens holder;
the driving mechanism includes:
a driving coil that is fixed at a periphery of the lens holder in a region on a side closer to the other of the upper leaf spring and the lower leaf spring,
a yoke that has a substantially quadrangular cylindrical shape and is uprightly provided on the base member, and
a driving magnet disposed at a pair of inner wall surfaces of the yoke which are opposite to each other in a first direction orthogonal to the direction of the optical axis such that the driving magnet is opposite to the driving coil; and
the lens holder driving device further includes a position detection part configured to detect a position of the lens holder in a region on a side closer to one of the upper leaf spring and the lower leaf spring.

7. The lens holder driving device according to claim 6, wherein the position detection part includes:
a sensor magnet as one of a pair of sensor magnets attached on corresponding outer peripheral surfaces of the lens holder in a second direction orthogonal to the direction of the optical axis and the first direction; and
a magnetic detection device provided to the base member such that the magnetic detection device is opposite to the sensor magnet.

8. A camera-equipped mobile terminal in which the lens holder driving device according to claim 1 is installed.

* * * * *